F. W. R. WILLIAMS.
AIR FILTER.
APPLICATION FILED MAR. 14, 1917.

1,282,345.

Patented Oct. 22, 1918.
4 SHEETS—SHEET 1.

F. W. R. WILLIAMS.
AIR FILTER.
APPLICATION FILED MAR. 14, 1917.

1,282,345.

Patented Oct. 22, 1918.
4 SHEETS—SHEET 2.

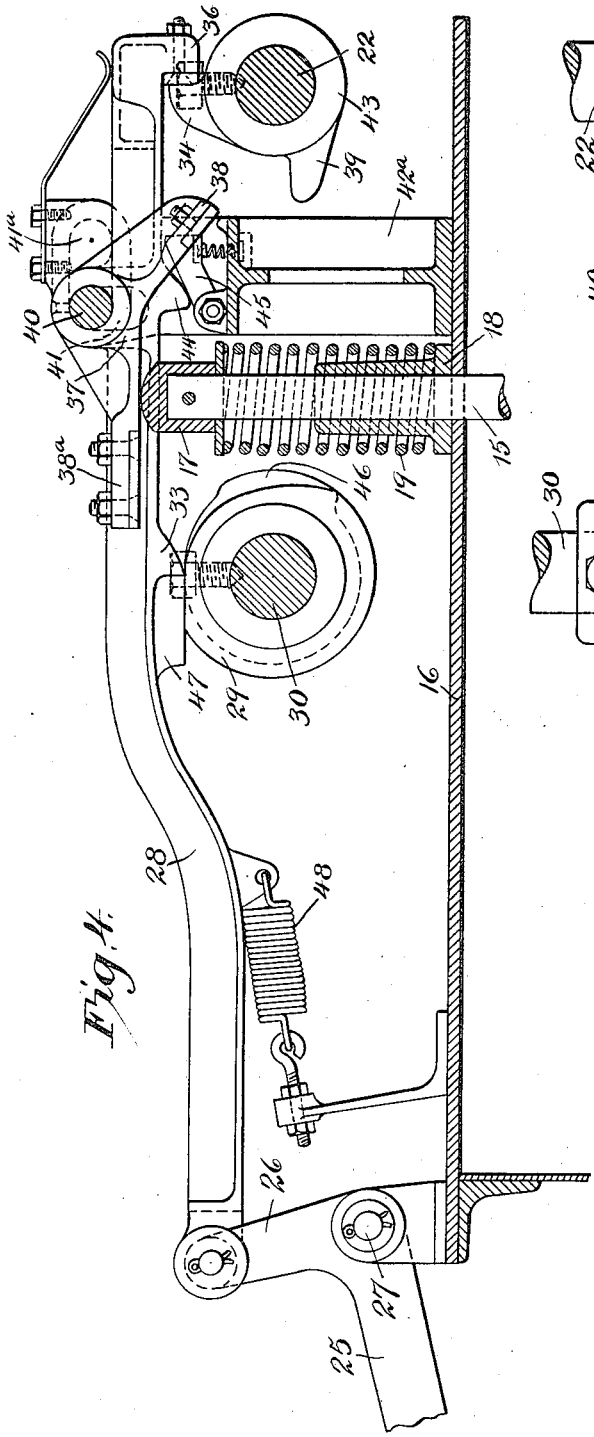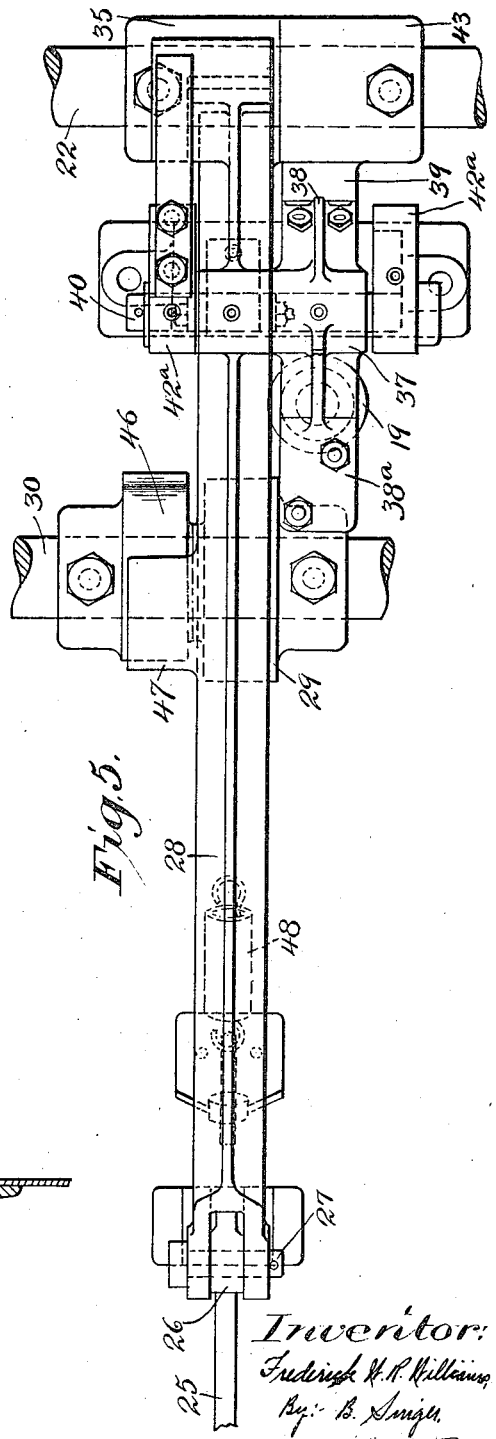

UNITED STATES PATENT OFFICE.

FREDERICK WILLIAM ROGERS WILLIAMS, OF LONDON, ENGLAND.

AIR-FILTER.

1,282,345.                    Specification of Letters Patent.          Patented Oct. 22, 1918.

Application filed March 14, 1917. Serial No. 154,809.

*To all whom it may concern:*

Be it known that I, FREDERICK WILLIAM ROGERS WILLIAMS, a subject of the King of Great Britain, and a resident of London, England, have invented certain new and useful Improvements in and Connected with Air-Filters, of which the following is a specification.

This invention relates to improvements in and connected with air filters and has reference to air filters of that character where the dust laden air is filtered by means of suitably suspended filter bags. The present invention has reference particularly to shaking mechanism, by means of which the bags are cleaned from time to time; of that character where the bags are normally held in tension under the influence of a spring, or springs, and periodically the upper ends of each series of bags are depressed against the influence of a spring, and are then suddenly released again, so that the spring operates rapidly to extend them into tension again and thus impart a jerk to effect the shaking operation. This operation takes place at predetermined intervals, the number of shakes required and provided for, depending upon the material being dealt with.

It will be understood by those conversant with this type of apparatus that the operations of the filter are continuous because the filtering surfaces *i. e.* the bags, are made in groups, and when one group of bags is being subjected to the shaking operation the others are operating to filter and collect the dust, a valve controlling the opening of the filter chambers to suction during the filtering period and to atmosphere during the shaking period being operated in synchronism with the throwing of the shaking mechanism out of and into operation.

The present invention consists of a particular construction and arrangement of mechanism of the foregoing general type, and this construction and arrangement involves as its essential characteristics a slidable valve operating rod carrying a shaking trigger, and means whereby the valve operating rod is caused to move periodically, and rapidly operate, a valve to open the filter chamber to suction during the filtering period, and to atmosphere during the shaking period, and at the same time to carry the shaking trigger out of and into a position where it is operated by a rotary shaking cam. Further features of importance, for use in combination with the foregoing essentials, which may be mentioned specifically are the provision of a timing cam mounted upon one shaft for controlling the periods of operation and a shaking cam mounted upon another shaft for effecting the shaking operation and the provision on the same shaft of a cam for raising the valve rod and a cam for controlling the duration of the shaking and filtering periods while upon another shaft both the cam for moving the valve rod and the cam for effecting the shaking are mounted.

In the accompanying drawings I have illustrated a filter constructed and operated in accordance with my invention.

In these drawings,

Fig. 4 is a sectional elevation on an enlarged scale of the valve operating mechanism, and Fig. 5 is a plan view of Fig. 4.

Figure 1:
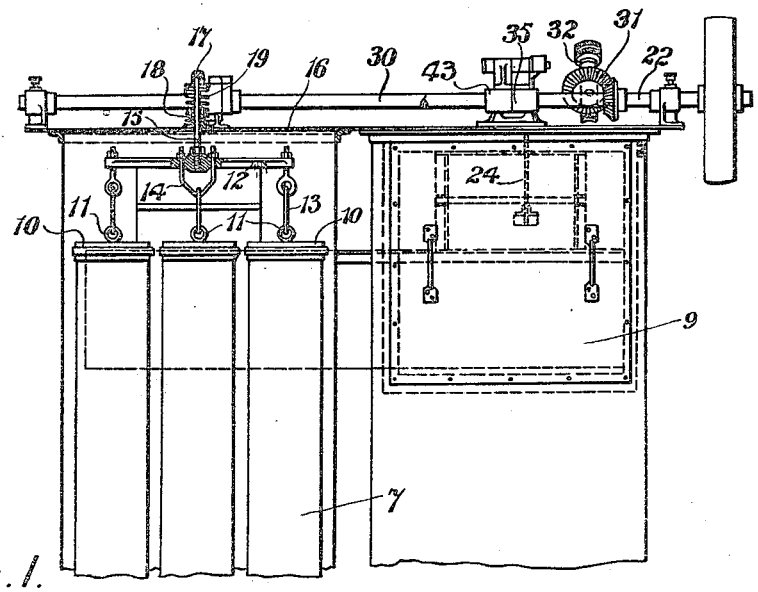
Figure 1 is a part sectional front elevation.
Figure 1:
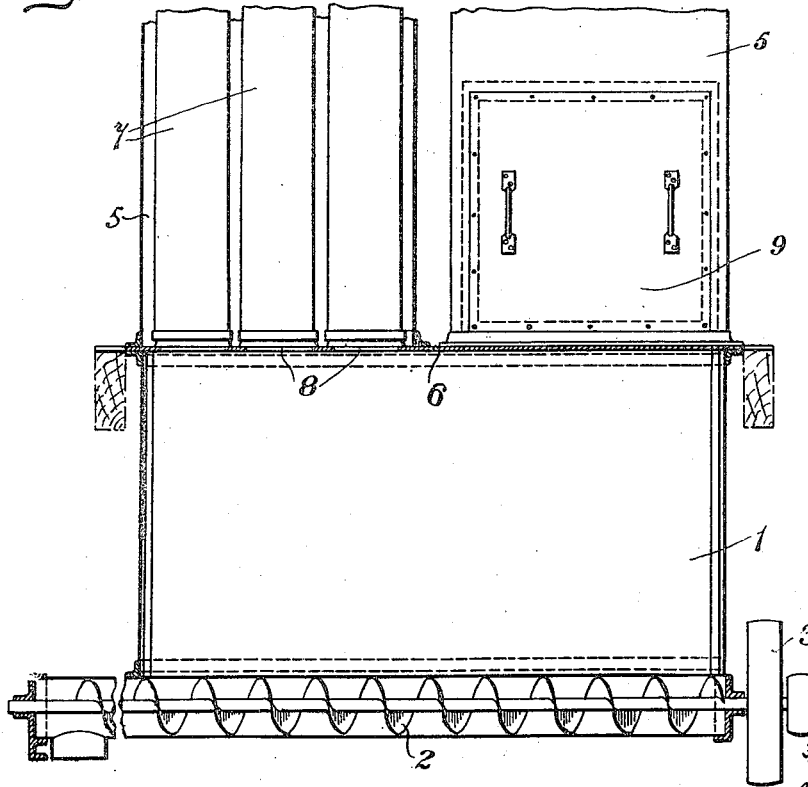

Referring to these drawings the numeral 1 designates a dust collecting hopper which is common to all the filter bags, and the dust collected in this hopper is removed by a rotating screw conveyer 2 driven by means of pulleys 3, or other suitable gearing, or by any other suitable means. The inlet pipe 4 for admitting the dust laden air to the filter is connected to the hopper at any convenient position such for instance as that shown in Fig. 2, and above the hopper the filtering chambers or casings 5 are located, and may be provided with doors 9 at top and bottom to permit of ready access to the interiors—in the present example two chambers are illustrated, which form a single unit, but it will be understood that any desirable number of units may be provided. Separating the chambers or casings 5 from the hopper 1 a base plate 6 is provided, and the filter bags 7 are suspended above openings 8 provided in this base plate, the bags being so connected to the base plate that the dust laden air enters the bags, the air passes through the filtering material of the bags, the dust being deposited on the inside of same, as will more clearly appear hereafter. The bags 7 are closed at their upper ends by end sleeves 10, having centrally disposed eyes 11, and each bag of a series is connected to an arm of a spider 12 by means of a link 13 and stirrup belt 14, or other suitable means. The spiders 12 are connected to shaking rods or spindles 15 which pass up through openings provided in a top plate 16 which closes the filter chambers or casings 5, suitable guides 18 being provided. The tops of the shaking rods 15 are provided with caps 17, and compression springs 19 are interposed between these caps 17 and the guides 18 carried upon the top plate 16, and normally the springs 19 operate to maintain the filter bags in tension as will be readily understood upon reference to the drawings. Leading into the tops of the filter chambers or casings 5 valve boxes 20 are provided and flap or butterfly valves 21 are mounted in these boxes. The tops of the valve boxes 20 are open to the atmosphere, these openings being controllable by means of the sliding cover 20ª and their bottoms are open to a suction fan, or fans, or the like, and it will be seen that with the valve 21 in the position shown in Fig. 2 the filter chamber or casing 5 is open to suction and closed to atmosphere which is the normal operating position. A shaking and valve control gear is provided for each series of filter bags and these gears are mounted upon the top plate 16. These gears are controlled from a common continuously driven shaking cam shaft 22 which may be driven at the desired speed in any suitable manner such for instance, as by a pulley drive as indicated in the drawings.

As the shaking and valve control gears are identical it will suffice to describe one of them.

Figure 2:
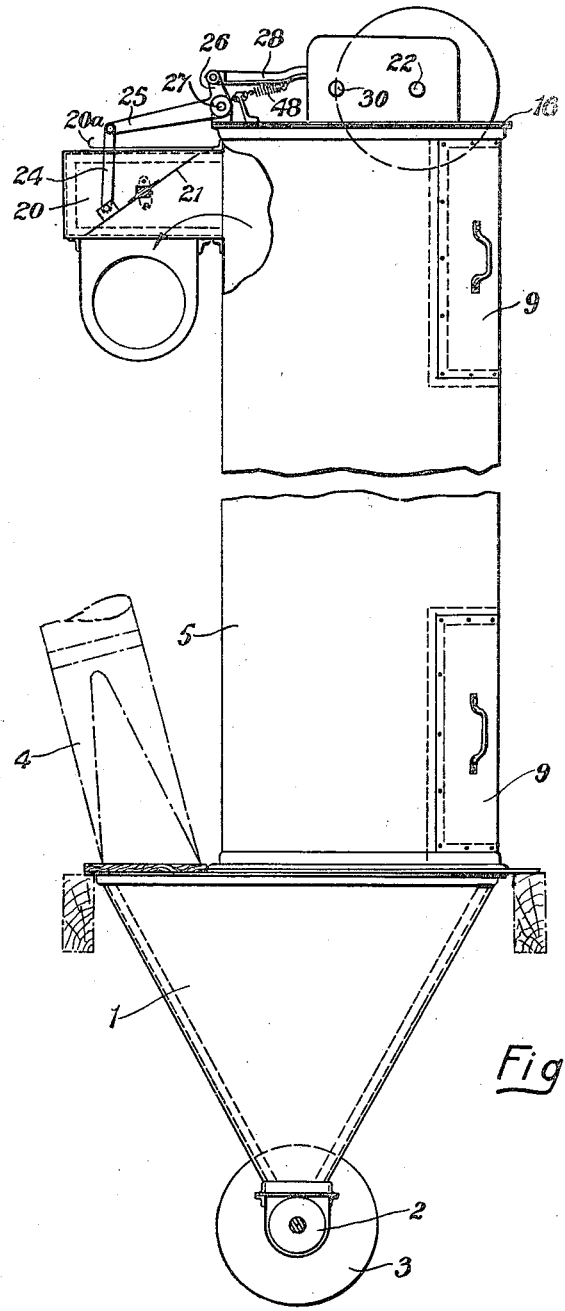
Fig. 2 is a side elevational view of Fig. 1.
Figure 3:
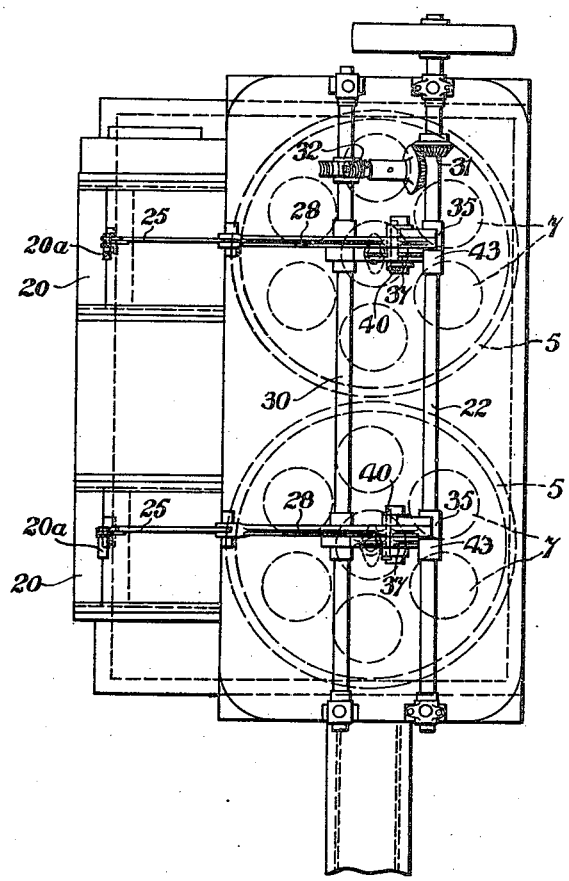
Fig. 3 is a plan view of Fig. 2.

Referring particularly to Figs. 2, 4 and 5 it will seen that the valve 21 is connected by means of a link 24 to one end 25 of a bell crank lever pivoted at 27 to a bracket mounted upon the top plate 16, and the other end 26 of this bell crank lever is connected to the extremity of a valve operating rod 28. This valve operating rod 28 is slidable bodily, and its movement is timed by the timing cams 29 and 46, which are mounted upon a shaft 30, which is driven from the shaft 22 through bevel wheel gearing 31 and a worm drive 32.

This valve operating rod 28 has a depending dog, or projection 33 which coöperates with the timing cam 29, and a depending cam surface or projection 47, having its working surface in the same horizontal plane as that of the dog 33, which coöperates with a cam 46; and it will be seen that the position shown in Fig. 4 is that where the dog 33 has just fallen off the highest part of the cam 29 and the projection 47 is on that point of the cam 46 where its curvature departs from the circular and this portion corresponds to the end of the filtering period and the commencement of the shaking period. At this point the dog or projection 34 of a cam 35 attached to the shaking shaft 22 engages the depending end 36 of the valve operating rod 28, and the rod 28 is moved bodily to the right, and this movement causes the reversal of the valve 21 through the bell crank lever 25, 26, and connecting link 24. This sudden reversal of the valve in consequence of the partial vacuum existing in the filter casing, effects a reversal of current. By this movement the valve operating rod 28 carries the shaking trigger 37—which is mounted upon a spindle 40 which passes through a vertical slot 41 in the valve operating arm 28 and a horizontal slot 41ª in the top parts of the brackets 42ª—into position where its arm 38 is in the path of a cam dog 39 upon a cam 43 similar to the cam 35. When the valve operating rod 28 has reached its extreme position, a catch 44 upon its underside will have depressed a spring stop 45 and become engaged with this stop, so that the rod 28 is prevented from returning. It will be noticed that in this position the dog 33 will be out of engagement with the cam 29 and the left hand tip of the projection 47 will engage that part of the cam 46 where its curvature commences to depart from the circular. The arm 38 of shaking trigger 37 being in the path of the cam dog 39, every revolution of the shaft 22 will cause the trigger 37 to operate, and its arm 38ª will cause the depression of the rod 15 against the influence of the spring 19, and immediately the cam dog passes clear, the trigger will be suddenly released and the spring 19 will expand again and impart a jerk which will insure the shaking of the filter bags. This shaking operation will occur as often as necessary and is determined by the relative speeds of the driving shafts 22 and 30.

During these shaking operations the lifting or releasing cam 46 coöperates with the left hand end of the projection or lump 47 on the valve operating rod 28. This lifting cam 46 comes into operation immediately the valve operating rod 28 has reached its extreme right hand position, and begins to raise the rod 28 slowly; and the cam is so shaped that by the time the shaking operation has been effected the rod 28 will be raised to its maximum vertical height, and the catch 44 on the rod 28 raised clear of the stop 45, whereupon the tension spring 48 will restore the valve operating rod 28 and the valve 21 to normal position, the projection 47 meanwhile sliding over the cam 46 until it engages the cam with its right hand end. The projection or dog 33 on the valve operating rod 28 will now ride upon the high part of the timing cam 29 and the cam 46 is so shaped that the projection 47 will be maintained clear of it while the filtering operation is proceeding, the dog 33 will then fall off the cam 29 again to the lower level, as shown in the drawings and the projection 47 engage the cam 46, when the shaking operation will be repeated in the manner before described.

It will be understood that the purified air will pass through the filter bags into the filter chamber or casing, and the dust arrested upon the inner surfaces of the bags will be shaken down into the hopper and removed by the conveyer 2, or by gravity.

What I claim and desire to secure by Letters Patent is:—

1. An air filter comprising a dust collecting hopper, a filtering chamber mounted upon said hopper, an inlet pipe for the admission of dust laden air into said chamber, a conveyer for removing the collected dust from said hopper, filter bags suspended in said chamber, a spider from the arms of which said filter bags are suspended, springs operating normally to maintain said bags in tension, a suction chamber communicating with said filtering chamber, a valve for alternately opening said filter chamber to suction and atmosphere, a valve operating rod, a link connection between said valve and said valve operating rod, means for causing said valve operating rod to slide bodily to operate said valve, a shaking trigger and means for momentarily operating said shaking trigger to collapse the filter bags against the influence of the springs and timing cams for timing said operations, substantially as specified.

2. An air filter comprising a dust collecting hopper, a filtering chamber mounted on said hopper, filter bags suspended in said filtering chamber, a spider from the arms of which said filter bags are suspended, a spring normally maintaining said filter bags in tension, a suction chamber communicating with said filtering chamber, a valve for alternately opening said filtering chamber to suction and atmosphere, a valve operating rod, a link connection between said valve operating rod and said valve, a shaking trigger adapted to be intermittently operated to collapse said filtering bags against the influence of the tensioning spring, a shaking cam controlling the operations of said trigger, a continuously driven shaft upon which said cam is mounted, a timing shaft, a bevel wheel on said cam shaft, a worm wheel on said timing shaft, a worm upon a countershaft gearing with said worm wheel, a bevel wheel on said countershaft gearing with the bevel wheel on said cam shaft and timing cam carried by said timing shaft, substantially as specified.

3. An air filter comprising a dust collecting hopper and a conveyer for removing the collected dust from said hopper, a filter chamber mounted upon said hopper, filter bags suspended in said chamber, means for suspending said filter bags and normally maintaining them in tension, a suction chamber communicating with said filter chamber, a valve located in said suction chamber, a rod for operating said valve to open said filter chamber to suction and atmosphere alternately, means for sliding said valve operating rod bodily in one direction, a spring for sliding the said rod in the other direction, a shaking trigger, means for operating said trigger to intermittently collapse the filter bags against the influence of the tensioning spring, a cam controlling the operations of said trigger, and timing cams for controlling the timing of the shaking and valve operating mechanism, substantially as described.

4. An air filter comprising a dust collecting hopper, a filtering chamber mounted upon said hopper, an inlet pipe for the admission of dust laden air into said chamber, a conveyer for removing the collected dust from said hopper, filter bags suspended in said chamber, a spider from the arms of which said filter bags are suspended, springs operating normally to maintain said bags in tension, a suction chamber communicating with said filter chamber, a valve for alternately opening said filter chamber to suction and atmosphere, a link connected at one end to the valve, a bell crank lever, one arm of which is connected to the valve operating rod and the other end to said link, means for causing said valve operating rod to slide bodily to operate said valve, a shaking trigger and means for momentarily operating said shaking trigger to collapse the filter bags against the influence of the springs and timing cams for timing said operations, substantially as specified.

In testimony whereof I affix my signature in presence of two witnesses.

FREDERICK WILLIAM ROGERS WILLIAMS.

Witnesses:
   JNO. T. MOULD,
   LEONARD M. ORANGE.